United States Patent [19]
Koike

[11] Patent Number: 6,126,414
[45] Date of Patent: Oct. 3, 2000

[54] THRUST BEARING ARRANGEMENT FOR TURBOCHARGER

[75] Inventor: Takaaki Koike, Hachiouji, Japan

[73] Assignee: Ishikawajima-Harima Heavy Industries Co., Ltd., Tokyo, Japan

[21] Appl. No.: 09/081,383

[22] Filed: May 19, 1998

[30] Foreign Application Priority Data

May 30, 1997 [JP] Japan ................................. 9-142452

[51] Int. Cl.[7] .................................................. F04B 17/00
[52] U.S. Cl. .......................... 417/407; 384/105; 384/121; 384/143
[58] Field of Search .............................. 417/407; 384/105, 384/121, 129, 135, 368; 277/590, 591, 907, 908, 909, 910, 79, 25; 310/90.5; 308/36.2

[56] References Cited

U.S. PATENT DOCUMENTS

| | | |
|---|---|---|
| 2,953,416 | 9/1960 | Collins et al. . |
| 3,740,170 | 6/1973 | Miller ........................ 417/407 |
| 4,171,137 | 10/1979 | Aizu et al. .................. 277/25 |
| 4,198,063 | 4/1980 | Shimizu et al. ............ 277/79 |
| 4,288,128 | 9/1981 | Wells ........................ 308/36.2 |
| 4,383,799 | 5/1983 | Okano et al. . |
| 4,392,752 | 7/1983 | Shimizu et al. ............ 384/135 |
| 4,453,837 | 6/1984 | Shimizu et al. ............ 384/121 |
| 4,640,630 | 2/1987 | Yoshioka et al. .......... 384/129 |
| 5,101,130 | 3/1992 | Jayawant et al. .......... 310/90.5 |
| 5,178,471 | 1/1993 | Roessler et al. ........... 384/369 |

FOREIGN PATENT DOCUMENTS

| | | |
|---|---|---|
| 11 55 942 | 10/1963 | Germany . |
| 53-165991 | 12/1978 | Japan . |
| 57-61816 | 4/1982 | Japan . |
| 4-119624 | 10/1992 | Japan . |
| 5-12634 | 2/1993 | Japan . |
| 5-12635 | 2/1993 | Japan . |
| 1 034 734 | 7/1966 | United Kingdom . |
| 2 039 632 | 8/1980 | United Kingdom . |

Primary Examiner—Tu M. Nguyen
Attorney, Agent, or Firm—McCormick, Paulding & Huber LLP

[57] ABSTRACT

A thrust bearing arrangement for a turbocharger including a thrust bearing unit having separate normal and reverse thrust bearings, and a thrust member provided on a turbine shaft and interposed between the normal and reverse thrust bearings. Both the normal and reverse thrust bearings are spaced from the turbine shaft in a radial direction of the turbine shaft and a lubrication oil is supplied to a first contact area between the normal thrust bearing and the thrust member. An oil guide portion is formed on a bearing housing for further supplying the lubrication oil to a second contact area between the thrust member and the reverse thrust bearing. A seal member is provided on the turbine shaft in slidable contact with an inner peripheral face of the normal thrust bearing.

18 Claims, 2 Drawing Sheets

THRUST BEARING ARRANGEMENT FOR TURBOCHARGER

BACKGROUND OF THE INVENTION

1. Technical Field

The present invention relates to a thrust bearing arrangement for a turbocharger.

2. Background Art

The present assignee/applicant proposed various thrust bearing arrangements for turbochargers. For example, such thrust bearing arrangements are disclosed in Japanese Utility Model Applications, Laid-Open Publication Nos. 4-119624 published Oct. 26, 1992, 5-12634 published Feb. 19, 1993 and 5-12635 published Feb. 19, 1993. The arrangement of Japanese Publication No. 4-119624 is shown in FIG. 3 of the accompanying drawings. FIG. 3 illustrates a compressor side of a turbocharger "s". A thrust bearing unit "a" includes a normal thrust bearing "b" and a reverse thrust bearing "c". An oil feed passage "e" extends through a bearing housing "f" and the normal thrust bearing "b" and opens to a pad face "d" of the normal thrust bearing "b". An oil supplied to the normal thrust bearing "b" from the passage "e" is further guided to a pad face "h" of the reverse thrust bearing "c" by a guide element "g" which is part of a bearing housing "f". A turbine shaft "i" has a thrust bushing "j" of L-shaped cross section and fitted thereon. The thrust bushing "j" is interposed between the normal thrust bearing "b" and the reverse thrust bearing "c" and serves as a thrust member for the turbine shaft "i".

During operation of the turbocharger "s", the turbine shaft "i" generally tends to move to the right in the drawing (i.e., normal thrust direction) and the thrust bushing "j" is often forced against the pad face "d" of the normal thrust bearing "b". In such a situation, an oil is directly supplied to the pad surface "d" for lubrication. On the other hand, when the turbine shaft "i" moves to the left (i.e., reverse thrust direction) and the thrust bushing "j" is correspondingly forced against the pad surface "h" of the reverse thrust bearing "c", the oil guided by the guide "g" lubricates the pad surface "h". In this manner, both the normal and reverse thrust bearings "b" and "c" are lubricated effectively. Appropriate lubrication results in prevention of deterioration in performances of the turbocharger "s" due to friction loss.

The turbine shaft "i" has an oil thrower "k" and a compressor wheel "p" fitted thereon respectively next to the thrust bushing "j" in the rightward direction of the illustration. The oil thrower "k" has a radially enlarged slinger portion "m" whose one face is exposed to the normal thrust bearing "b" with a certain clearance. The other face of the slinger portion "m" on the compressor side is exposed to an oil deflector "o" with a certain gap. The oil deflector "o" is clamped between the bearing housing "f" and a sealing plate "n". Combination of the slinger "m" and the oil. deflector "o" prevent oil leakage toward the compressor. The slinger "m" disperses the oil and the oil deflector "o" collects the dispersed oil and guides it to an oil drain (not shown). The turbocharger "s" has also a turbine wheel (not shown) on the left side of the turbine shaft "i".

SUMMARY OF THE INVENTION

The inventor found by experiments that a necessary and sufficient amount of oil was generally supplied to the thrust bearings "b" and "c" in the conventional arrangement shown in FIG. 3 of the accompanying drawings, and that amount was very small. Thus, there was no substantial oil leakage even when the slinger "m" and the oil deflector "o" were dispensed with. In particular, if the oil thrower "k" does not have the slinger "m" which is a rotating element, a moment of inertia is reduced. Reducing the moment of inertia results in improvement of the turbocharger performances.

On the other hand, it is of course preferred for the sake of safety and reliability that the thrust bearing arrangement is equipped with a means for preventing oil leakage.

An object of the present invention is to propose a thrust bearing arrangement for a turbocharger which does not have a slinger and an oil deflector but is equipped with an alternative means for preventing oil leakage, which alternative means exerts a less moment of inertia (particularly the moment of inertia at a position of the slinger "m" is reduced).

According to one aspect of the present invention, there is provided a thrust bearing arrangement for a turbocharger, comprising a thrust bearing unit having separate normal and reverse thrust bearings spaced from each other in a longitudinal direction of a turbine shaft and spaced from the turbine shaft in a radial direction of the turbine shaft, a bearing housing for housing the thrust bearing unit, a thrust member provided on the turbine shaft and interposed between the normal and reverse thrust bearings, with a lubrication oil being supplied to a first contact area between the normal thrust bearing and the thrust member, a guide portion formed on the bearing housing for further supplying the lubrication oil to a second contact area between the thrust member and the reverse thrust bearing, and a seal member provided on the turbine shaft in slidable contact with an inner peripheral face of the normal thrust bearing.

The seal member prevents leakage of the lubrication oil from the thrust bearing arrangement. In addition, an outer diameter of the seal member is generally smaller than an inner diameter of the normal thrust bearing. It other words, the seal member is positioned radially inward of the normal thrust bearing. Thus, a lower moment of inertia is generated as compared with a conventional arrangement having a radially enlarged member.

The guide portion of the bearing housing may completely surround the thrust member circumferentially with a certain gap to define an oil chamber around the thrust member, and a passage may be formed in the bearing housing which extends to a turbine side of the turbocharger from the oil chamber. The lubrication oil is supplied to the first contact area. On the other hand, the lubrication oil supplied to the floating metal or radial bearing eventually reaches the second contact area. The lubrication oil is further transferred to near the turbine (e.g., an oil jacket for the turbine) by the passage to cool the turbine. In this manner, the lubrication oil is used effectively. The bearings on the turbine side, the seals and the turbine are also cooled by the lubrication oil. Cooling the turbine improves performances of the turbocharger.

BRIEF DESCRIPTION OF THE ACCOMPANYING DRAWINGS

DETAILED DESCRIPTION OF THE PREFERRED EMBODIMENTS

Now, preferred embodiments of the present invention will be described with reference to the accompanying drawings.

Figure 1:
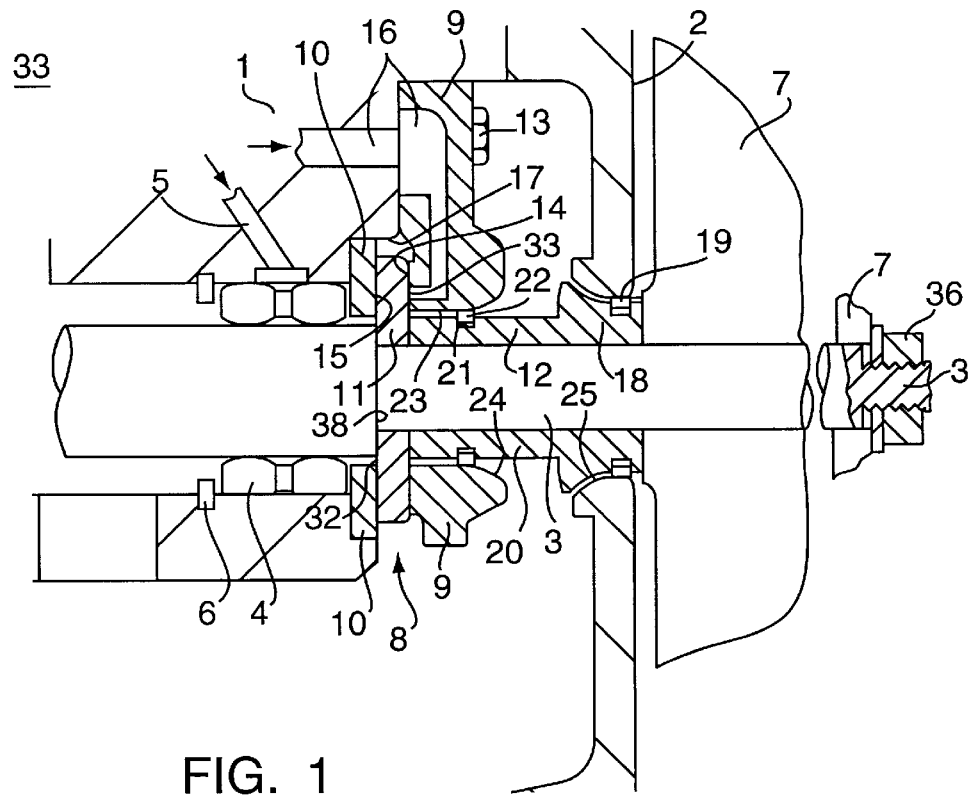
FIG. 1 illustrates a sectional view of a thrust bearing arrangement for a turbocharger according to the present invention.

Referring to FIG. 1, illustrated is a compressor side of a turbocharger 33. A bearing housing 1 of the turbocharger 33 has an integral seal plate 2 elongated perpendicularly to a turbine shaft 3. The turbine shaft 3 extends through the bearing housing 1. The turbine shaft 3 is floatingly supported by a floating metal or radial bearing 4 in a radial direction such that it can rotate about its axis. The bearing housing 1 also has a first oil feed passage 5 to supply a lubrication oil to the radial bearing 4 as indicated by the rightward declining arrow. A retaining ring 6 is received in a groove formed in an inner wall of a turbine shaft bore of the bearing housing 1 for restricting movement of the radial bearing 4 to the left in the drawing.

On the right side of the turbine shaft 3 in the illustration, provided is a compressor wheel 7. A turbine wheel (not shown) is provided on the turbine shaft 3 on the left side. In FIG. 1, therefore, the right side of the drawing is a compressor side and the left side is a turbine side, and the right is a normal thrust direction and the left is a reverse thrust direction.

A thrust bearing unit 8 is provided in a space between the bearing housing 1 and the seal plate 2. Specifically, the thrust bearing unit 8 is provided to contact a compressor-side face of the bearing housing 1. The thrust bearing unit 8 includes a normal thrust bearing 9 and a reverse thrust bearing 10. The normal and reverse thrust bearings 9 and 10 are separate elements. A thrust collar 11, having bearing surfaces 32 and 33 facing in opposite directions axially of the turbine shaft 3, and an oil thrower 12 are provided on the turbine shaft 3 in turn in the right direction of the drawing. The thrust collar 11 and the oil thrower 12 are firmly secured on the turbine shaft 3 when the compressor wheel 7 is secured on the turbine shaft 3, as by a nut 36 threaded onto the right end of the shaft 3 in conventional manner, so that the wheel 7, oil thrower 12 and thrust collar 11 are all axially clamped between the nut and a shoulder 38 of the shaft 3 engaging the left side face of the thrust collar.

The normal thrust bearing 9 is secured on the bearing housing 1 by a bolt 13 and the reverse thrust bearing 10 is fixed on the bearing housing 1 by press fitting. The normal and reverse thrust bearings 9 and 10 sandwich the thrust collar 11 by their pad surfaces 14 and 15 such that the thrust collar 11 can rotate with the turbine shaft 3 and thrust forces are applied to the thrust collar 11 from the pad surfaces 14 and 15. The thrust collar 11 is a thrust member for the turbine shaft 3. A second oil passage 16 extends through the bearing housing 1 and the normal thrust bearing 9 and reaches the pad surface 14 of the normal thrust bearing 9. The lubrication oil is fed to the pad surface as indicated by the rightward arrow from an oil source (not shown). The bearing housing 1 has an annular recess to receive the reverse thrust bearing 10 and the annular recess defines a stepwise portion in cross section. The corner of this stepwise portion 17 above the thrust collar 11 (i.e., oil guide portion) connects the normal thrust bearing 9 with the reverse thrust bearing 10. The oil guide portion 17 guides the lubrication oil fed from the second oil feed passage 16 to the pad surface 15 of the reverse thrust bearing 10.

During operation of the turbocharger 33, if the turbine shaft 3 intends to move to the right in the drawing (i.e., normal thrust direction), the thrust collar 11 is forced against the pad surface 14 of the normal thrust bearing 9. The lubrication oil is directly fed to a contact area between the thrust collar 11 and the pad surface 14 for lubrication. Thus, lubrication to the fad surface 14 is maintained. On the other hand, when the turbine shaft 3 intends to shift to the left (or reverse thrust direction), the thrust collar 11 is forced against the pad surface 15 of the reverse thrust bearing 10. Then, no load acts on the opposite pad surface 14 so that oil feeding from the second oil passage 16 is accelerated. The lubrication oil is guided by the guide portion 17 toward the pad surface 15. Thus, lubrication to the pad surface 15 is also maintained. In this manner, lubrication to the thrust bearing unit 8 is achieved with a small amount of oil in an effective manner. Since only a small amount of lubrication oil is fed to the thrust bearing unit 8, there is no substantial oil leakage. It should be noted that the pad surface 15 of the reverse thrust bearing 10 is also lubricated by a surplus oil among that supplied to the radial bearing 4 from the first oil passage 5.

Figure 3:
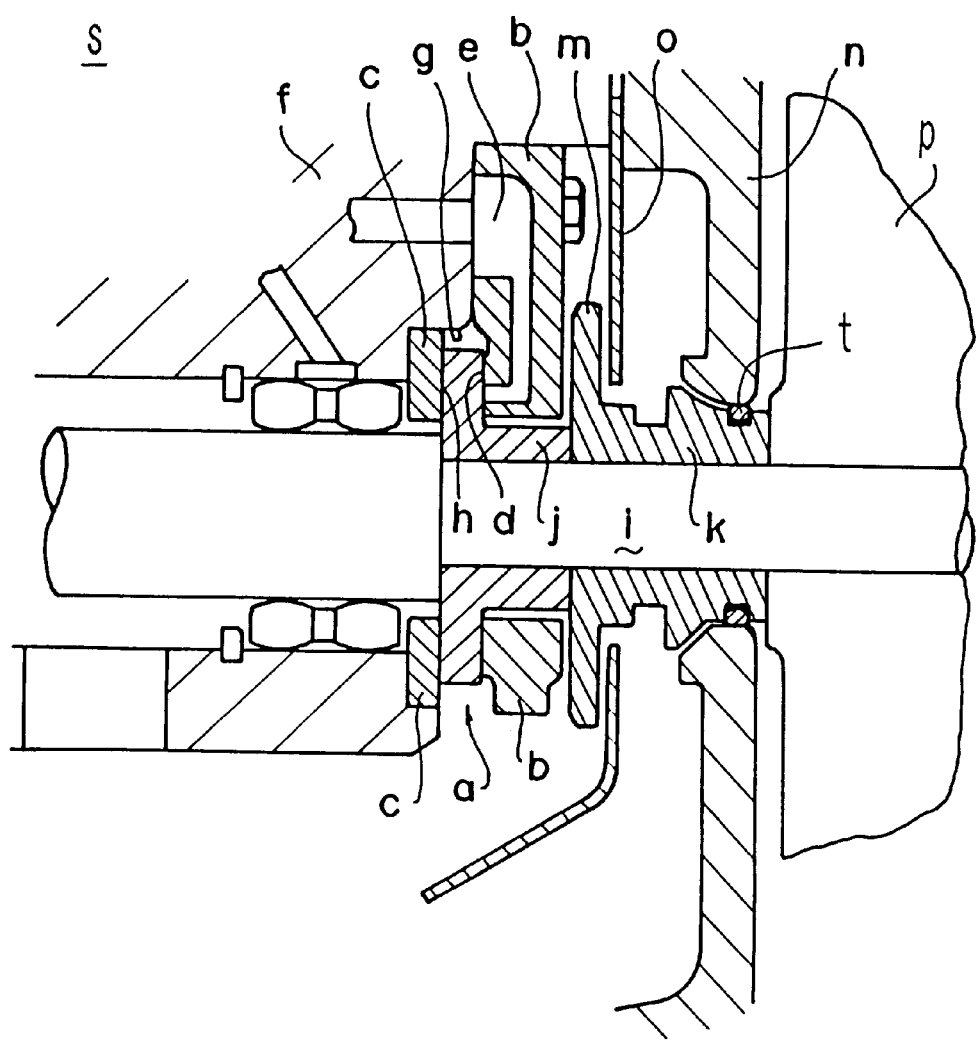
FIG. 3 illustrates a cross sectional view of a conventional arrangement.

The oil thrower 12 has an umbrella-like enlarged portion 18 on the right end (or the end on the compressor side), and a first seal ring (i.e., piston ring) 19 is received in an annular recess formed in a surface of the umbrella portion 18. The first seal ring 19 is in slide contact with an inner peripheral surface of the seal plate 2 to prevent the oil from leaking to a compressor chamber (not shown) when the turbine shaft 3 is rotated. The first seal ring 19 is the first seal for the turbine shaft 3. It should be noted that the conventional arrangement also has a similar seal ring "t" on an umbrella portion of the oil thrower "k" as illustrated in FIG. 3.

In the present invention, that portion 20 of the oil thrower 12 except the umbrella portion 18 is a cylindrical member having a constant diameter. This portion is considerably smaller than the oil thrower "i" of the conventional arrangement shown in FIG. 3. In particular, the oil thrower 12 of the invention does not have a slinger "m". In addition, the thrust collar 11 of the invention, which corresponds to the thrust bushing "j" of the conventional arrangement (FIG. 3), does not have an L-shaped cross section, but instead has an I-shaped cross section. In short, the thrust collar shown in FIG. 1 is an annular plate. Also, the cylindrical portion 20 of the oil thrower 12 is elongated to the left in the drawing as compared with the oil thrower "i" shown in FIG. 3, and abuts onto a right face of the thrust collar 11. There is a certain gap between the innermost face 23 of the normal thrust bearing 9 and the cylindrical body 20 of the oil thrower 12 in a radial direction. The cylindrical body 20 has a circumferential groove 21, and a second seal ring (piston ring) 22 is received in this groove 21. The second seal ring 22 is in slide contact with an inner peripheral surface 23 of the normal thrust bearing 9 when the turbine shaft 3 rotates. The second seal ring 22 establishes sealing between the center bore 23 of the normal thrust bearing 9 and the cylindrical body 20 of the oil thrower 12. The second seal ring 22 is the second seal for the turbine shaft 3. This second seal ring 22 is not seen in the conventional arrangement of FIG. 3 and characterizes the present invention. The center bore 23 of the normal thrust bearing 9 has a relatively long taper portion 24 which is diametrically gradually enlarged toward the compressor wheel 7 so that the oil thrower 12 with the second seal ring 22 is smoothly received in the center bore 23. The second seal ring 22 is diametrically reduced upon installation of the oil thrower 12. In order to form the taper portion 24, the normal thrust bearing 9 has a thicker portion (or expanded portion) toward the compressor wheel 7. For the same reason, a center bore 25 of the seal plate 2 has a taper portion to conform with a peripheral configuration of the umbrella portion 18 of the oil thrower 12.

In the present invention, the oil slinger "m" of the conventional arrangement (FIG. 3) is not provided but the second seal is provided on the turbine shaft 3. Therefore, the oil leakage toward the umbrella portion 18 of the oil thrower 12 would be prevented even if it occurred. It should be noted that there is little possibility of oil leakage since a very small amount of lubrication oil is fed to the thrust bearing unit 8 as mentioned above. In the present invention, since the slinger "m" and the oil deflector "o" of the conventional arrangement (FIG. 3) are both dispensed with, moment of inertia is reduced and therefore performances of the turbocharger 33 are improved. It is also possible to design the turbocharger 33 to be compact and simple and to reduce a manufacturing cost of the turbocharger 33.

Figure 2:
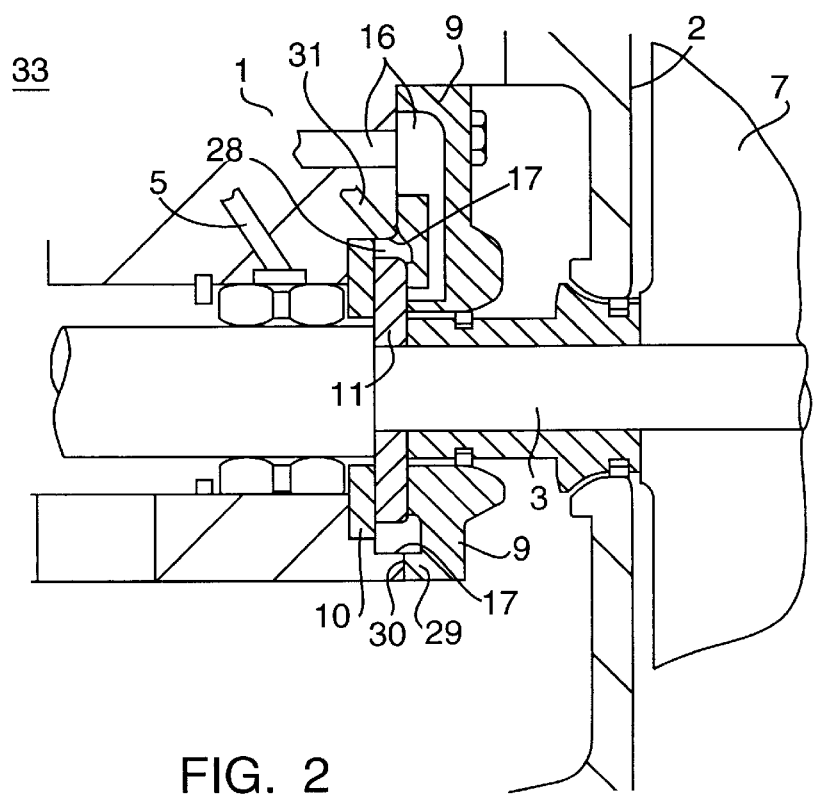
FIG. 2 illustrates a sectional view of another thrust bearing arrangement for a turbocharger according to the second embodiment of the present invention.

Referring now to FIG. 2, illustrated is a second embodiment of the present invention. Like reference numerals are assigned to like parts in FIGS. 1 and 2 and description of these parts is occasionally omitted.

In this embodiment, the left end face of the normal thrust bearing 9 near its outer periphery is entirely attached to the bearing housing 1. Specifically, the normal thrust bearing 9 has a generally annular extension 29 extending to the left and the bearing housing 1 has a mating annular extension 30 extending to the right. As a result, the oil guide portion 17 is formed on the bearing housing 1 at not only above the thrust collar 11 but also other portions. The oil guide portion 17 defines an annular wall around the thrust collar 11 in a circumferential direction and therefore an annular space (oil chamber) 28 is defined by the guide portion 17, the thrust collar 11, the normal thrust bearing 9 and the reverse thrust bearing 10. The oil chamber 28 confines the thrust collar 11 and is used as a chamber for holding the oil fed fron the second oil path 16. In the illustrated embodiment, a path 31 is formed in the bearing housing 1 which extends from the oil chamber 28 to an oil jacket (not shown) near the turbine of the turbocharger 33. Thus, the lubrication oil supplied to the oil chamber 28 from the oil feed paths 5 and 16 is further transferred to the oil jacket for cooling of the turbine. The performances of the turbocharger 33 are improved if the turbine is cooled. In sum, the communication 31 contributes to effective use of the oil and improvement of the turbocharger performances.

It should be noted that the present invention is not limited to the above described and illustrated embodiments. For example, the second seal ring 22 may be dispensed with if oil leakage does not occur without the second seal ring 22. Eliminating the second seal ring 22 may be performed with eliminating the groove and/or the taper surface 24.

What is claimed is:

1. A thrust bearing arrangement for a turbocharger, comprising:
    a thrust bearing unit having both a normal thrust bearing and a reverse thrust bearing separate from the normal thrust bearing, the normal and reverse thrust bearings being spaced from each other in an axial direction of a turbine shaft and spaced from the turbine shaft in a radial direction of the turbine shaft;
    a bearing housing for housing the thrust bearing unit with both the normal and reverse thrust bearings being fixed to the bearing housing;
    said normal thrust bearing having a normal pad surface facing axially of said turbine shaft and said reverse thrust bearing having a reverse pad surface facing axially of said turbine shaft in the direction opposite to that of the normal thrust bearing;
    said normal and reverse pad surfaces being spaced from one another axially of the turbine shaft and facing one another;
    a single thrust member provided on the turbine shaft and having two bearing surfaces facing in opposite directions axially of the turbine shaft, said thrust member being interposed between the normal and reverse pad surfaces of the normal and reverse thrust bearings with said two bearing surfaces being engageable respectively with the normal and reverse pad surfaces of the normal and reverse thrust bearings, and with a lubrication oil being supplied to a first contact area between the normal thrust bearing and the thrust member;
    a guide portion formed on the bearing housing for further supplying the lubrication oil to a second contact area between the thrust member and the reverse thrust bearing; and
    a seal member provided on the turbine shaft and received in a spacing between the normal thrust bearing and the turbine shaft such that the seal member is in slidable contact with an inner periphery of the normal thrust bearing.

2. The thrust bearing arrangement of claim 1, wherein the guide portion of the bearing housing surrounds the thrust member circumferentially with a certain gap to define an oil chamber around the thrust member, and a passage is formed in the bearing housing which extends to the vicinity of a turbine of the turbocharger from the oil chamber for further transferring the lubrication oil to the vicinity of the turbine.

3. The thrust bearing arrangement of claim 1, wherein the seal member includes a generally cylindrical element fitted on the turbine shaft and a seal ring received in a peripheral groove of the generally cylindrical element such that the seal ring is in slidable contact with the inner periphery of the normal thrust bearing.

4. The thrust bearing arrangement of claim 3, wherein the generally cylindrical element is an oil thrower.

5. The thrust bearing arrangement of claim 3, wherein the seal ring is a piston ring.

6. The thrust bearing arrangement of claim 1, wherein the bearing housing has a first bore for passage of the lubrication oil from an oil source to the normal thrust bearing and the normal thrust bearing has a second bore communicated with the first bore for further passage of the lubrication oil to the first contact area.

7. The thrust bearing arrangement of claim 1, wherein another lubrication oil is fed to a radial bearing of the turbocharger and the thrust hearing arrangement further includes means for supplying the another lubrication oil to the second contact area.

8. The thrust bearing arrangement of claim 1, wherein the thrust member and the seal member are secured relative to the turbine shaft when a compressor wheel of the turbocharger is mounted on the turbine shaft.

9. The thrust bearing arrangement of claim 3, wherein the thrust member and the generally cylindrical element are secured relative to the turbine shaft when a compressor wheel of the turbocharger is mounted on the turbine shaft.

10. The thrust bearing arrangement of claim 3, wherein the generally cylindrical element has another peripheral groove to receive a second seal ring in slidable contact with a seal plate which radially inward extends from the bearing housing near the compressor wheel.

11. The thrust bearing arrangement of claim 1, wherein the thrust member is a thrust collar.

12. The thrust bearing arrangement of claim 1, wherein the thrust member has a first pad surface that contacts the normal thrust bearing and a second pad surface that contacts the reverse thrust bearing.

13. The thrust bearing arrangement of claim 1, wherein the thrust member is rotatably interposed between the normal and reverse thrust bearings.

14. The thrust bearing arrangement of claim 1, wherein the thrust member is an annular plate.

15. The thrust bearing arrangement of claim 11, wherein the thrust collar is an annular plate.

16. A thrust bearing arrangement for a turbocharger, comprising:

a thrust bearing unit having a normal thrust bearing and a reverse thrust bearing, the normal and reverse thrust bearings being spaced from each other in a longitudinal direction of a turbine shaft and spaced from the turbine shaft in a radial direction of the turbine shaft;

a bearing housing for housing the thrust bearing unit;

a thrust member provided on a turbine shaft and interposed between the normal and reverse thrust bearings, with a lubrication oil being supplied to a first contact area between the normal thrust bearing and the thrust member;

a guide portion formed on the bearing housing for further supplying the lubrication oil to a second contact area between the thrust member and the reverse thrust bearing; and a seal member provided on the turbine shaft and received in a spacing between the normal thrust bearing and the turbine shaft such that the seal member is in slidable contact with an inner periphery of the normal thrust bearing;

wherein the seal member includes a generally cylindrical element fitted on the turbine shaft and a seal ring received in a peripheral groove of the generally cylindrical element such that the seal ring is in slidable contact with the inner periphery of the normal thrust bearing; and wherein a diameter of the inner periphery of the normal thrust bearing is generally constant and slightly greater than a diameter of the generally cylindrical element between the thrust member and the seal ring and is gradually enlarged toward a compressor of the turbocharger.

17. The thrust bearing arrangement of claim 16, wherein both the normal thrust bearing and the reverse thrust bearing are fixed relative to the bearing housing, and the thrust member is fixed to the turbine shaft.

18. The thrust bearing arrangement of claim 17, wherein the thrust member has one bearing surface facing axially of the turbine shaft and engageable with the normal thrust bearing and another bearing surface facing axially of the turbine shaft in a direction opposite to that of the one bearing surface and engageable with the reverse thrust bearing.

* * * * *